Figure 1:
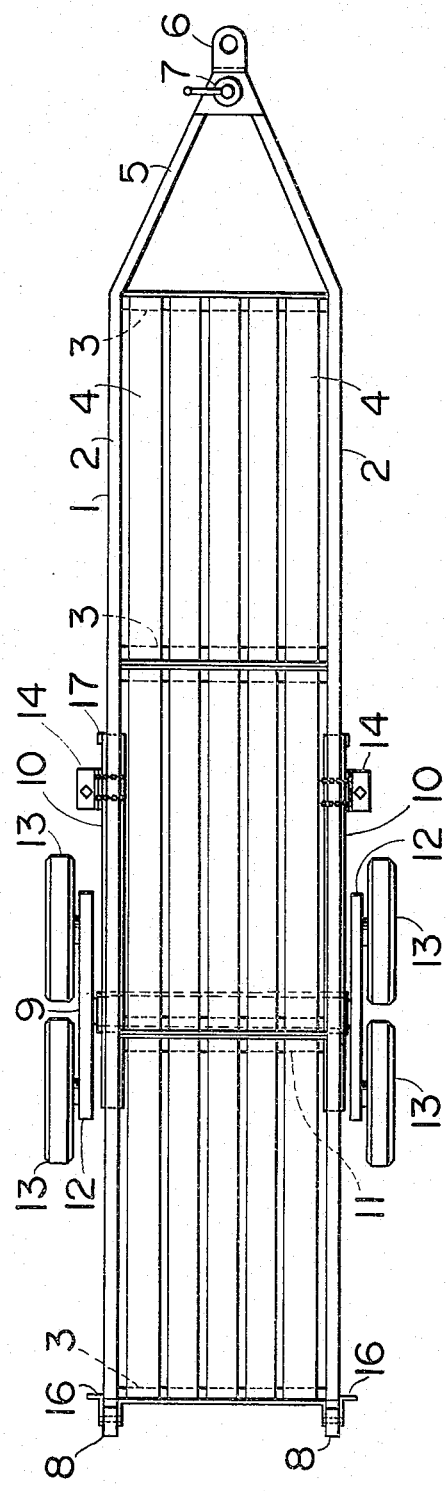

United States Patent [19]

Machan

[11] 3,910,436
[45] Oct. 7, 1975

[54] HEAVY IMPLEMENT TRAILER

[76] Inventor: Frank P. Machan, Box 157, Wallaceburg, Ontario, Canada

[22] Filed: Oct. 10, 1974

[21] Appl. No.: 513,583

[52] U.S. Cl............................ 214/506; 280/43.11
[51] Int. Cl.² ........................................ B60P 1/04
[58] Field of Search .......... 214/505, 506; 280/43.11

[56] References Cited
UNITED STATES PATENTS
| | | | |
|---|---|---|---|
| 2,638,315 | 5/1953 | Wagner | 254/86 R |
| 3,179,271 | 4/1965 | Donahue | 214/506 |
| 3,497,232 | 2/1970 | Richey | 280/43.11 |

Primary Examiner—Leo Friaglia
Attorney, Agent, or Firm—Charles Krassov

[57] ABSTRACT

This invention consists of a trailer which can be pulled by a tractor or car for the purpose of transporting light or heavy farm machinery, equipment, and materials. It consists of comparatively long platform which rests upon a shorter carriage upon which it is normally free to slide. The carriage consists of a fixed section to which four heavy duty rubber tired wheels are attached, two on each side; and a pivoted section, upon which the said platform slides. Two locking devices are provided; one prevents the sliding of the said platform, while the other serves to lock the wheels from rotation. When the wheels are locked and the sliding lock is released, the platform is pulled forward causing the pivoted parts of the carriage to tip to the ground thereby also dropping the platform to the ground level for easy loading. By backing up the tractor unit, the platform slides back upon the carriage bringing the carriage to its original level position and itself rising off the ground. By locking the platform to the carriage to prevent sliding, and releasing the lock upon the wheels, the trailer is ready to be pulled. The trailer, being independent of the platform, can be located upon the carriage in any position to provide proper distribution of and support for the load. A jack is provided at the front end of the platform by means of which the elevation of the platform front can be controlled.

3 Claims, 5 Drawing Figures

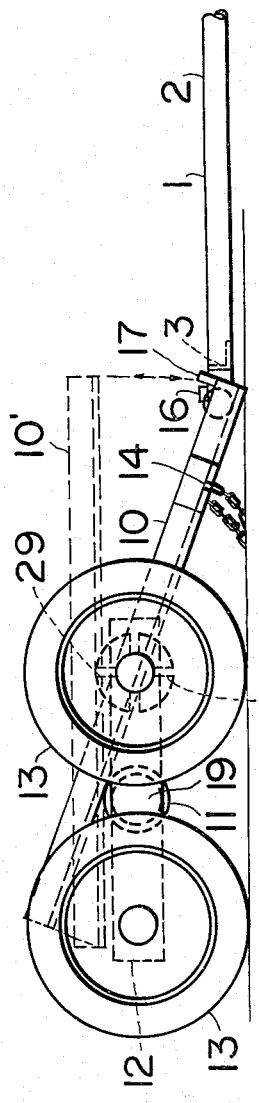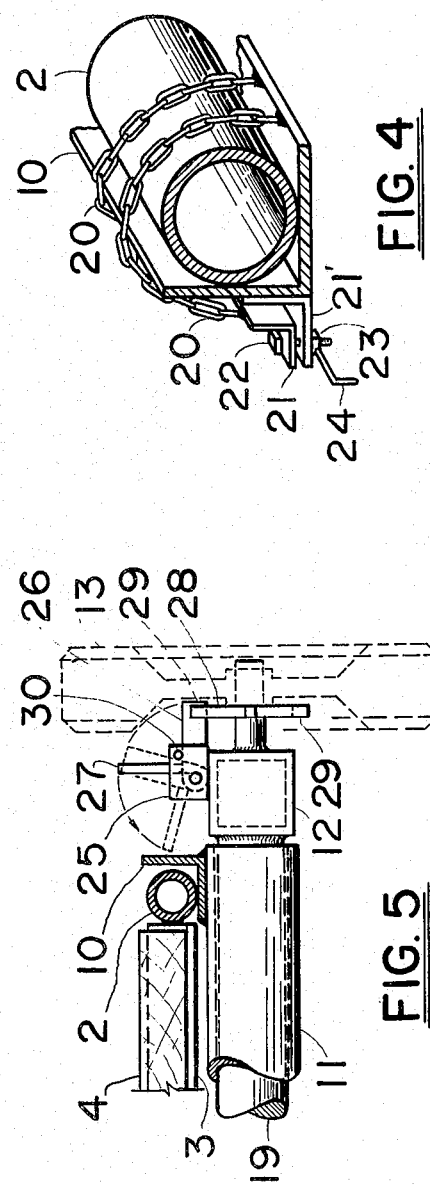

HEAVY IMPLEMENT TRAILER

This invention relates generally to trailers used to load and transport heavy equipment and materials, particularly for the purpose of loading and transporting such equipment and material in areas where loading equipment such as hoists, cranes or fork trucks are not available, as for instance on farms.

The primary object of the invention is to provide a trailer as described above which can assume a ground level position for easy loading and an off ground position for transportation, simply by the forward or reverse movement of its tractor, and Another object of the invention is to provide a trailer such as described above in which its wheels can provide proper support and proper weight distribution for heavy loads by varying the location of said wheels in relation to the said platform so that they are directly below the heaviest concentration of the load.

This is accomplished in the invention by providing a trailer consisting primarily of a loading platform which is independent of and which slides upon a carriage having a fixed section with wheels attached thereto, and a pivoted section upon which the said platform slides. By pulling the platform forward, the pivoted section tips downwardly towards the ground thereby lowering the loading platform to ground level for loading; and by pushing the platform it assumes its original position above the ground to clear obstacles on the road during transportation.

Figure 2:
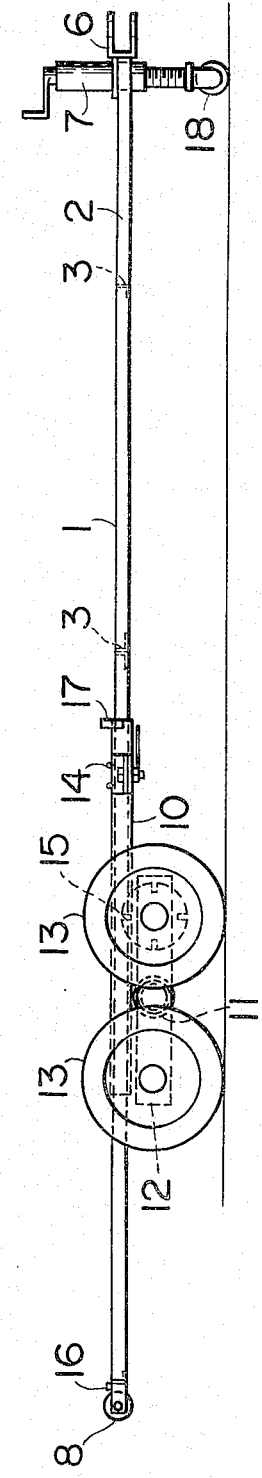

In describing the invention reference will be made to the attached drawings in which, FIG. 1 is a plan of the trailer,
FIG. 2 is an elevation of the trailer,
FIG. 3 is a part elevation showing the trailer in the loading position,
FIG. 4 is an isometric diagram showing the platform to carriage locking device, and
FIG. 5 shows the wheel locking device.

In the drawings is shown an elongated rectangular loading platform 1 which slides upon a carriage 9.

This loading platform is made up of pipe side walls 2 preferably of a metal which provides a slight degree of flexibility. Side walls 2 are spaced and joined together by angle iron sections 3 which support a plurality of thick wooden planks 4 which run parallel to the sidewalls 2. These wooden planks form the floor of the said platform.

At the front of the platform, the side walls 2 converge to form a triangle 5, the apex of which is provided with a U-shaped hitch attachment 6 by means of which the trailer can be attached to a tractor or a car.

Immediately behind the hitch attachment the triangle 5 is provided with a plate which holds a jack 7. The bottom of this jack is provided with a wheel 18. At its rear end, each side wall 2 is provided with a small wheel 8 which facilitates the sliding of the platform 1 upon the carriage 9.

The carriage 9 consists of a swiveling part comprised of two spaced inwardly toeing angle irons 10,10, which are spaced and joined together by a tube 11; and a fixed part comprised of two spaced axle bars 12,12, which are located directly below, parallel to, and on the outside of the angle irons 10. The axle bars 12,12, which are of a rectangular box section, are held together, and spaced by a shaft 19 which is free to rotate within the tube 11.

Rotatably attached to each of the axle bars 12 are a minimum of two heavy duty rubber tired wheels 13,13, which constitute the wheels of the trailer. Depending upon the weight of the load to be carried, additional wheels can be provided, in separate or dual form, to the axle bars, to take care of the load.

A locking mechanism 14 as shown in FIG. 4, is fixed to each of the carriage angle irons 10,10, by means of which the platform 1 can be prevented from sliding when the trailer is being transported. It consists of chains 20 which are attached to the toe of the angle iron 10, and which wrap around each of the side walls 2 and over the angle iron 10. To the free end of the chain 20 is attached a short length of angle iron 21 which nests in another short piece of angle iron 21' attached to the outside and bottom of the iron 10. The angle irons 21 and 21' are drilled with corresponding bolt holes through which passes a bolt 22. The side walls 2, can be tightened against movement by the nut 23 which is provided with a handle 24 by means of which it is rotated thereby eliminating the need of a wrench, when one may not be available.

In the process of lowering the platform 1 to ground level for loading, which is described fully further on in the specification, it is necessary to lock the wheels 13 to prevent movement of the carriage 9. This can, of course, be accomplished by locking only one of the said wheels so that it acts as a brake. The wheel locking mechanism 15, as shown in FIG. 5, consists of a disk 28 which is provided with several notches 29 around its periphery. This disk is rigidly attached to the hub of the wheel 13 so that it rotates with the wheel.

Two spaced small walls 25,25, are attached to the axle bar 12 close to but spaced from the disk 28. In between the said small walls is pivotally attached a latch 26 which fits into anyone of the notches 29. The latch 26, which is provided with a handle 27 by means of which it is manipulated, when located within one of the disk notches 29, prevents the wheel 13 from rotating. When the latch 26 is removed from the notch 29, to allow the wheel to rotate, it is prevented from accidently falling into a notch, by a pin 30 which passes through the walls 25 and is located under the said latch when it is in the raised position.

To prevent the platform 1 from completely separating from the carriage 9, when the plaform is assuming the ground level position, as shown in FIG. 3, stops 16,16, are provided at the rear end of the said platform. These stops engage stops 17,17, which are located on the front ends of the carriage angle irons 10,10.

To describe the loading procedure of the trailer, we will assume that we are starting from its off ground positions, and that the trailer is in the proper location for loading. The first step is to lock the wheels against rotation, by removing the pin 30 of the wheel locking mechanism 15; and with the disk notch 29 in the proper position, the latch 26 will fall into the said notch. The next step consists of releasing the platform locks 14,14, by unbolting the chain 20. This allows the platform 1 to slide freely upon the carriage 9. A tractor or car (not shown in the drawings) then pulls the platform 1 until its stops 16,16, engage the stops 17,17, of the carriage. The weight of the platform tips the angle iron part of the carriage so that the platform assumes the ground level position as shown in FIG. 3. The platform is then unhitched from the tractor and the lowering of the front end of the platform is then controlled by means of the jack 7.

After the platform is loaded, the jack 7 raises its front end which is again hitched to the tractor which backs up, pushing the platform back on to the carriage, and stopping at the approximate location of the center of gravity of the load approximately above the center line of the wheels. Then the platform is locked to the carriage by the locks 14,14, and the latch 26 is lifted out of the notch 29, the pin 30 is inserted in the walls 25,25, to hold the said latch in the raised position, thus freeing the wheels for rotation.

Having described the invention what I claim is:

1. A trailer for transporting heavy implements and materials, comprising in combination a platform consisting of an elongated, rectangular framework of two parallel pipes or tubing spaced and held together by angle iron cross pieces upon which are located a number of heavy wooden planks running parallel to and between the said pipes, each of said pipes provided at its rear end with a small but heavy wheel slightly larger in diameter than the diameter of said pipe, and said pipes converging at their ends to form a triangle, a hitch mounted at the vertex of said triangle for attachment to a tractor; and a jack equipped with a wheel at the bottom thereof, located behind the hitch for raising and lowering the front end of said platform; a carriage supporting said platform and upon which the said platform can slide backward or forward comprising an upper section consisting of two parallel spaced angle iron tracks toeing inwardly and spaced and held together by a tubular cross piece; a lower section comprising two spaced axle bars of rectangular cross-section to which are attached the wheels of the trailer; a shaft located within the said tubular cross piece and attached at each end to each of said axle bars so that the upper section can swivel upon the lower section of the carriage; a plurality of rubber tired wheels attached to each of said axle bars; a horizontal bar stop at each rear end of said platform pipes, and a vertical bar stop at the front ends of each of said angle iron tracks, said stops engaging each other to prevent the separation of the platform and carriage; means for locking the platform to the carriage to prevent platform sliding; and means for locking the carriage wheels against rotation.

2. A trailer such as described in claim 1 in which the mechanism which locks the said platform to the upper swivelling part of the carriage comprises a plurality of spaced chains, each of said chains being fixed at one end to the toe of each of said angle iron tracks, and each free end of said chains being fixed to a short length of angle iron which nests inside of a larger angle iron rigidly attached to the outer wall of each of the angle iron tracks; a bolt and nut which bolts together the two nesting angle irons so that the pipe sections of the platform are contained and held tightly within the said chains, and a handle attached to the said nut by means of which the nut can be rotated.

3. A trailer such as described in claim 1 in which the wheel locking mechanism comprises a disc, with notches around its periphery, attached to the inner face of the wheel hub; a latch consisting of a bar which is swivable at one end, and the free end of which fits into any one of said disc notches, a pair of small spaced walls containing the said latch and supporting its swivel end between them, a handle attached to the said latch for raising and lowering the latch, a pin which can be inserted into or removed from the said walls, said pin being located immediately under the said latch when it is not contained in one of said disc notches; and said entire locking mechanism being attached to one of the said axle bars in a position to allow the said latch to fall into one of said notches to prevent rotation of the wheel.

* * * * *